United States Patent [19]
Litt et al.

[11] Patent Number: 5,148,370
[45] Date of Patent: Sep. 15, 1992

[54] EXPERT SYSTEM AND METHOD FOR BATCH PRODUCTION SCHEDULING AND PLANNING

[75] Inventors: Maria Litt, Cleveland Hts.; Jack C. Chung; Gary G. Leininger, both of Solon; David C. Bond, University Heights, all of Ohio

[73] Assignee: The Standard Oil Company, Cleveland, Ohio

[21] Appl. No.: 725,224

[22] Filed: Jun. 26, 1991

Related U.S. Application Data

[63] Continuation of Ser. No. 63,183, Jun. 17, 1987, abandoned.

[51] Int. Cl.$^5$ .............................................. G06F 15/00
[52] U.S. Cl. ................................. 364/468; 395/904; 395/906; 395/926; 364/401
[58] Field of Search ................. 395/904, 906, 926; 364/148, 150, 153–156, 401–403, 468

[56] References Cited

U.S. PATENT DOCUMENTS

| | | | |
|---|---|---|---|
| 4,459,663 | 7/1984 | Dye | 364/403 |
| 4,509,123 | 4/1985 | Vereen | 364/403 |
| 4,646,238 | 2/1987 | Carlson, Jr. et al. | 364/403 |
| 4,648,023 | 3/1987 | Powell | 364/156 |

OTHER PUBLICATIONS

S. B. Gershwin, et al., "A Control Perspective on Recent Trends in Manufacturing Systems," *IEEE Control Systems Magazine*, pp. 3–15 (Apr. 1986).
W. I. Bullers, et al., "Artificial Intelligence in Manufacturing Planning and Control," *AIIE Transactions*, pp. 351–363 (Dec. 1980).
M. S. Fox et al., *ISIS: A Constraint Directed Reasoning Approach Job Shop Scheduling*, Intelligent Systems Laboratory, The Robotics Institute, Carnegie–Mellon University Technical Report, pp. 83–88 (Jun. 21, 1983).
G. Bruno, et al., "A Rule-Based System to Schedule Production," *Computer*, pp. 32–40 (Jul. 1986).
A. L. Kidd, et al., "Man-machine interface issues in the construction and use of an expert system," *International Journal of Man-Machine Studies*, vol. 22, pp. 91–102 (1985).
R. O'Keefe, "Simulation and Expert Systems—A Taxonomy and Some Examples," *Simulation*, pp. 10–16 (Jan. 1986).

*Primary Examiner*—Allen R. MacDonald
*Attorney, Agent, or Firm*—Larry W. Evans; Joseph G. Curatolo

[57] ABSTRACT

A method employed by an expert system for batch scheduling the multiple-pass manufacture of a plurality of parts (12) by at least one parts process (22), where the parts (12) have a plurality of delivery dates and the parts (12) and parts processor (22) have a plurality of production constraints variable during manufacture, includes creating a knowledge base of select characteristics of the parts processor and parameters of the parts, and generating a plurality of rules expressing a scheduling and planning strategy that substantially satisfies parts delivery dates, substantially maximizes use of the parts processor, substantially maximizes part throughput, substantially minimizes energy utilization of the parts processor and meets the production constraints. Parts (12) suitable for simultaneous processing by the parts processor are combined into all possible preferred combinations by applying a first plurality of the rules to the knowledge base. Preferred combinations are scheduled for manufacture in batches by applying a second plurality of the rules to the knowledge base.

45 Claims, 5 Drawing Sheets

EXPERT SYSTEM AND METHOD FOR BATCH PRODUCTION SCHEDULING AND PLANNING

This is a file wrapper continuation of U.S. Ser. No. 07/063,183, filed Jun. 17, 1989, now abandoned.

TECHNICAL FIELD

The present invention relates generally to computer expert systems. More particularly, the present invention relates to computer expert systems for heuristically optimal scheduling and planning of manufacturing where multiple parts are manufactured simultaneously in multiple-pass batch operations and a large number of manufacturing constraints vary during such manufacture.

BACKGROUND ART

Scheduling and planning manufacturing operations are most desirably done in such manner as to meet required completion dates while simultaneously optimizing throughput and minimizing manufacturing costs. Computers operating under the control of conventional programming have been utilized advantageously to develop optimal manufacturing (also known as production) schedules for many production processes. However, in some systems, particularly those in which a number of discrete parts are manufactured simultaneously in a single operation, the production requirements create combinatorial optimization problems which require an impractical amount of computer time to solve. Additionally, certain production operations require repetitive and variable processing of manufactured parts (in other words, are dynamic in nature). In these instances, conventional programming is incapable of developing production schedules because most of the scheduling actions are non-quantifiable heuristics.

Expert systems, a class of so-called artificial intelligence imbued computer systems in which the analytical skills of an expert are set forth as rules dependent upon and applied against the expert's domain of knowledge (the "knowledge base") are capable of finding solutions to such problems. Several different rule-based expert system paradigms have been utilized in production scheduling and planning. Logic programming has been shown to be applicable in production planning in the paper by W. I. Bullers, S. Y. Nof and A. B. Whinston entitled "Artificial Intelligence in Manufacturing Planning and Control," AIIE Transactions, December 1980, pp 351–363. Similarly, a job shop scheduling system may be based on a schema representation paradigm as disclosed in the paper by M. S. Fox, et. al., entitled "ISIS: A Constraint Directed Reasoning Approach to Job Shop Scheduling," Intelligent Systems Laboratory, The Robotics Institute, Carnegie Mellon University Technical Report, Jun. 21, 1983, pp 83–88. Advantages of using a rule-based system for scheduling production in a so-called flexible manufacturing system have been described in the article by G. Bruno, A. Elia, and P. Laface entitled "A Rule-Based System to Schedule Production," Computer, July 1986, pp 32–40.

Heretofore, to our knowledge, no one has developed the heuristics and knowledge base necessary to produce a complete rule-based expert system capable of scheduling a multiple-pass batch production process, such as the glassing and furnacing operation for manufacture of glass-lined vessels used in chemical manufacturing. Such an expert system must account for numerous constraints including, but not limited to, availability and capacity of the furnace, availability of firing tools, allowed part mix, firing temperature and allowed differences in the thickness of the parts. Such an expert system must also provide the best solution to meeting delivery date requirements, optimizing furnace utilization and minimizing energy consumption. Furthermore, the solution should preferably be optimized for a plurality of furnaces that may operate simultaneously.

DISCLOSURE OF INVENTION

It is, therefore, an object of the invention to provide a rulebased expert system for the batch production planning and scheduling of parts requiring repetitive and variable processing.

It is another object of the invention to provide a rule-based expert system, as above, in which the parts are processed in a parts processor, and the determined schedule satisfies parts delivery dates, maximizes use of the parts processor, maximizes total part throughput, minimizes energy utilization and meets related production constraints.

It is still another object of the invention to provide a rule-based expert system, as above, in which parts and parts processors may be easily added, deleted and modified.

It is yet another object of the invention to provide a rule-based expert system, as above, in which scheduling is optimized for a plurality of parts processors.

It is a further object of the invention to provide a rule-based expert system, as above, in which the parts processor is a furnace and the determined schedule optimizes the firing of parts in a plurality of available furnaces.

These and other objects and advantages of the present invention over existing prior art forms will become more apparent and fully understood from the following description in conjunction with the accompanying drawings.

In general, a method for batch scheduling the manufacture of a plurality of parts by at least one parts processor, the parts having a plurality of delivery dates and the parts and parts processor having a plurality of production constraints variable during manufacture, includes creating a knowledge base of select characteristics of the parts processor and parameters of the parts, and generating a plurality of rules expressing a planning and scheduling strategy that substantially satisfies parts delivery dates and meets the production constraints. Parts suitable for simultaneous processing by the parts processor are combined into all possible preferred combinations by applying a first plurality of rules to the knowledge base. Preferred combinations are scheduled for manufacture in batches by applying a second plurality of rules to the knowledge base.

An expert system for batch scheduling the manufacture of a plurality of parts by at least one parts processor, the parts having a plurality of delivery dates and the parts and parts processor having a plurality of production constraints variable during manufacture, includes a knowledge base for storing select characteristics of the parts processor and parameters of the parts, and means for interpreting the characteristics and parameters and generating a schedule to manufacture the parts in batches that substantially satisfies parts delivery dates and meets the production constraints. The means for interpreting the characteristics and the parameters include a first plurality of rules for combining parts suitable for simultaneous processing by the parts processor into all possible preferred combinations and a second group of rules for scheduling the preferred combinations for manufacture in batches.

PREFERRED EMBODIMENT FOR CARRYING OUT THE INVENTION

Figure 1:
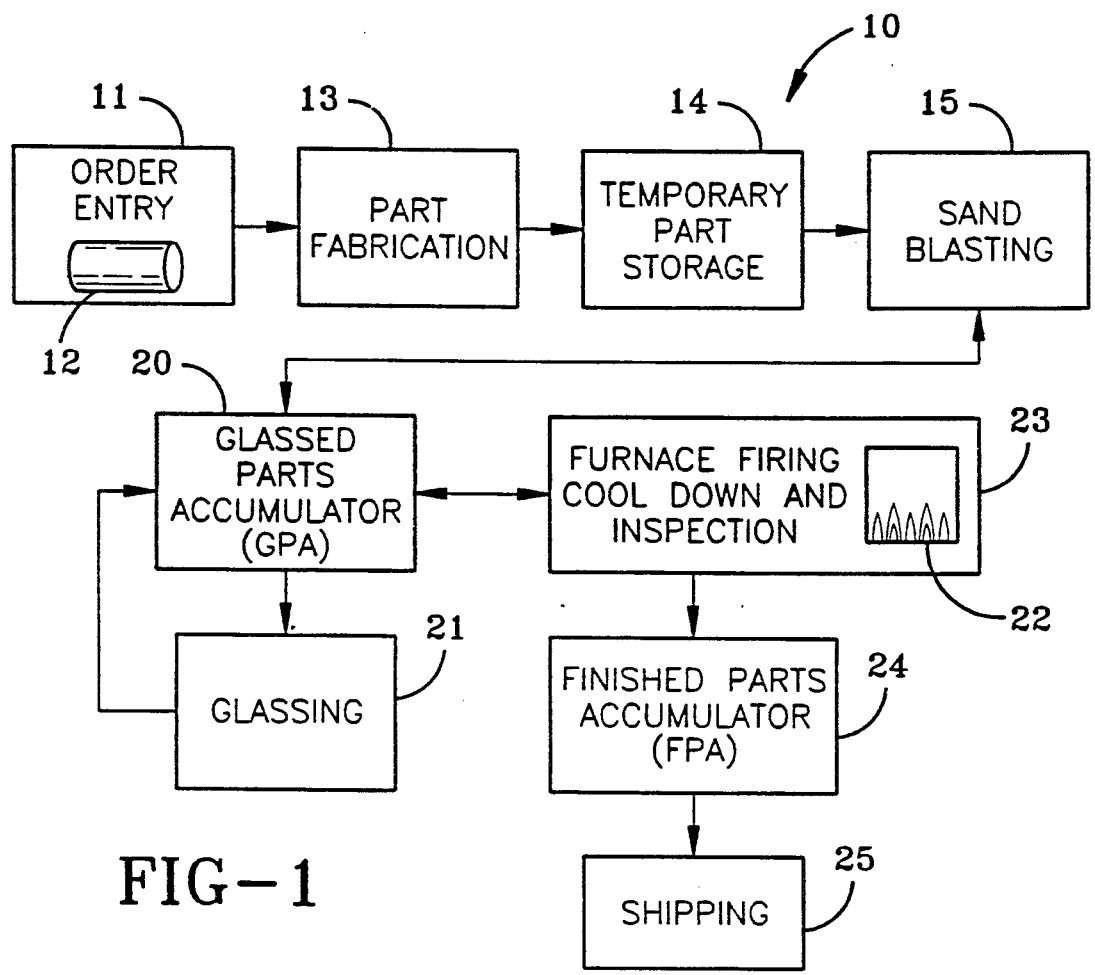
FIG. 1 is a block diagram of an exemplary overall production process according to the concept of the present invention for the manufacture of glass-lined vessels.

FIG. 1 depicts an exemplary overall production process, indicated by the numeral 10, for an exemplary part requiring repetitive production processing, such as glass-lined vessels used for chemical manufacture. The overall production process is begun with an entry of an order 11 for one or more part(s) 12 and fabrication 13 of the ordered part 12. In the present example ordered parts 12 include vessel bodies (sometimes referred to as tanks) of five different size ranges (very large, large, medium, small and very small), agitators (in two sizes, large and small), and miscellaneous small parts including covers, man-holes and supporting legs. Fabrication of different parts 12 require different machining operations and fabrication times. After fabrication, all parts are accumulated in a temporary storage area 14 for further processing.

In order to properly adhere the glass-linings to part 12, the parts 12 must first undergo sandblasting 15 to remove existing oxidation and thereafter must be promptly glassed and fired before substantial oxidation can reoccur. The sandblasted parts are passed through a glassed parts accumulator 20 (hereinafter called "GPA") to a glassing operation 21, and again pass through GPA 20 to a furnace 22 for furnace firing, cool down and inspection 23 (hereinafter called "firing"). Each part undergoes several glassing coats and therefore returns to GPA 20 and glassing 21 as required. Once the final glass coat of a part 12 has been fired and passed inspection, the part 12 is held in a finished parts accumulator 24 (hereinafter called "FPA") until all parts 12 in its associated order are collected and passed to shipping 25. If a part fails to pass any inspection, it may be returned for sandblasting and the entire glassing process begun anew.

Figure 2:
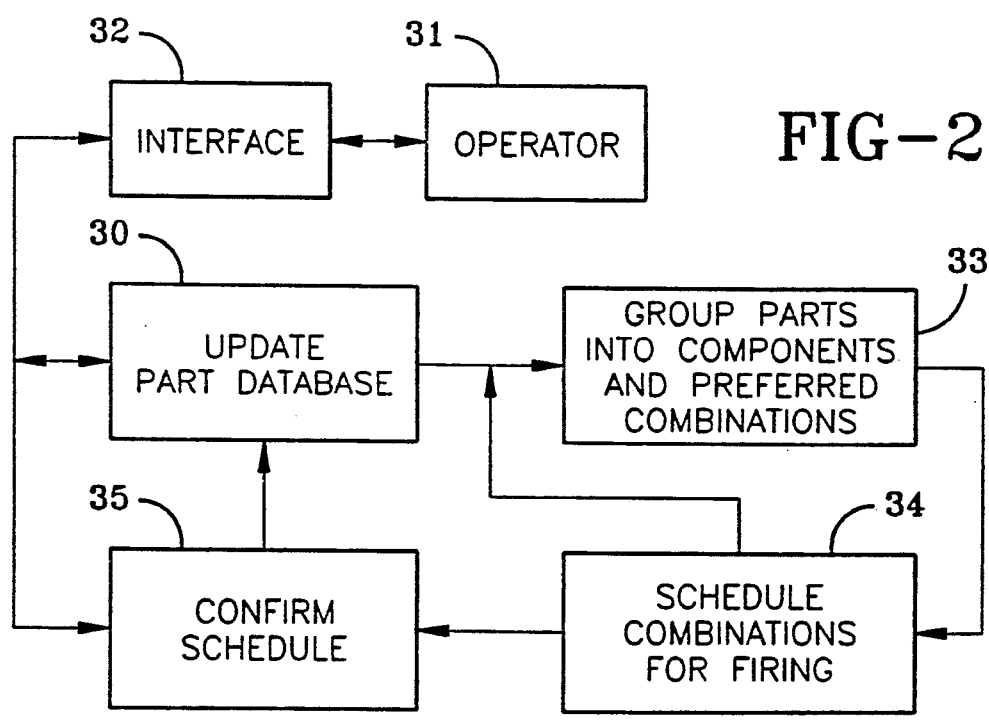
FIG. 2 is a block diagram of an exemplary overall expert system strategy according to the concept of the present invention for optimally scheduling the production process depicted in FIG. 1.

FIG. 2 presents an overall expert system strategy for optimally scheduling the production process depicted in FIG. 1. The principal goal of this expert system is to schedule sandblasting 15 and firing 23 of parts 12 to satisfy delivery dates, maximize furnace utilization, maximize parts throughput, minimize energy use and meet production constraints. However, to best understand this strategy, several additional aspects of production process 10 must first be appreciated.

The nature of the production process for manufacture of glasslined vessels, like that of other production processes where parts must be repetitively and variably processed, inherently places numerous constraints on scheduling. Sandblasting, loading and firing operations impose scheduling limitations that may be classified as capacity, resource, time and operations related constraints.

Capacity constraints on scheduling are governed by the characteristics of the furnace 22 and parts 12. Often the characteristics of the furnace 22 and parts 12 permit several parts 12 to be simultaneously fired in the furnace 22. Parts requiring identical processing may be grouped into what may be called "components" for simultaneous firing, although it should be understood that single larger parts or single parts with unique characteristics may themselves make up a component. Components may be collected into combinations preferred for meeting the principal goal (called "preferred combinations").

In the particular example herein each part has been classified into the following categories based upon its type, size and weight:

TABLE 1

| PART CLASSIFICATION | |
|---|---|
| Category | Part Description |
| A | Very Large Vessel |
| B | Large Vessel |
| C | Medium Vessel |
| D | Small Vessel |
| E | Very Small Vessel |
| F | Large Agitator |
| G | Small Agitator |
| H | Cover/Man-Hole/Leg |

Since more than one part 12 classified in categories D through H will fit into furnace 22 at one time, multiple parts in each category suitable for identical processing are grouped into components. Specifically, a D component may include no less than 2 and no more than 3 small vessels (category D parts), an E component may include no less than 4 and no more than 8 very small vessels (category E parts), and F, G and H components include no less than 4, 8 and 4 and no more than 10, 15 and 8 parts, respectively, of their own category. In the present example parts suitable for identical processing will have the same temperature and firing cycle (explained hereinbelow) and differences in part thickness within the selected 4 millimeter limitation.

Components may be further combined preferentially based on furnace utilization as follows:

TABLE 2

| GROUP PREFERRED COMBINATIONS | | | | | |
|---|---|---|---|---|---|
| Group # | Rank | Component Content | Group # | Rank | Component Content |
| 1 | 1 | A | 16 | 1 | E & E |
| 2 | 1 | B & B | 17 | 5 | E |
| 3 | 4 | B | 18 | 3 | E & F |
| 4 | 2 | B & C | 19 | 4 | E & G |

TABLE 2-continued

GROUP PREFERRED COMBINATIONS

| Group # | Rank | Component Content | Group # | Rank | Component Content |
|---|---|---|---|---|---|
| 5 | 3 | B & D | 20 | 4 | E & H |
| 6 | 1 | C & C & C | 21 | 1 | F & F |
| 7 | 3 | C & C | 22 | 5 | F |
| 8 | 5 | C | 23 | 2 | F & G |
| 9 | 4 | C & D | 24 | 4 | F & H |
| 10 | 1 | D & D | 25 | 1 | G & G |
| 11 | 5 | D | 26 | 5 | G |
| 12 | 4 | D & E | 27 | 4 | G & H |
| 13 | 3 | D & F | 28 | 1 | H & H |
| 14 | 4 | D & G | 29 | 5 | H |
| 15 | 4 | D & H | | | |

Resource constraints on scheduling result from the furnace not always being available (either because it is in use or shut down for maintenance or other reason) and the tools used for part handling (such as racks and other firing tools) not always being available (because either the number of tools is limited or the tools are in use). Time constraints on scheduling include the time remaining for firing before the next shut down period is to begin, the time required for sandblasting each part 12, the time required for firing each part 12, and the time necessary between each firing of each coat for part 12 handling and coat application.

Scheduling constraints resulting from operations (called "operational constraints") may include: any requirement that certain parts 12 always be fired within fixed time intervals; permissible combinations of parts 12 (noted hereinabove); and required firing temperatures and firing cycles (the temperatures at which parts 12 may be loaded into, fired and unloaded from furnace 22). In the present example furnace 22 has three possible firing cycles: a "normal-fire cycle" in which parts 12 are both loaded into and unloaded from furnace 22 at relatively high temperature; a "slow-heat-slow-cool cycle" in which parts 12 are both loaded into and unloaded from furnace 22 at relatively low temperature; and a "mini-cycle" in which parts 12 are loaded into furnace 22 at relatively high temperature and unloaded from furnace 22 at relatively low temperature.

As seen in FIG. 2 the overall expert system scheduling strategy employed is straightforward. Initially a database of parts 12 is created and updated in step 30 to reflect the present status of all parts 12. The database may include the customer order number, a part description, the delivery date, the parts 12 weight, thickness and category, the next glassing sequence to be performed and whether the part 12 is ready for its next glassing sequence. Data maybe entered by an expert system operator 31 acting through a menu-driven interface 32, including video display and keyboard.

In the next major step 33, available parts 12 are grouped into components and the components are collected into all possible preferred combinations. The optimal scheduling for firing 22 and sandblasting 15 is determined in step 34 using the rules set forth hereinafter. If during the implementation of a schedule parts 12 become ready for firing, step 33 is repeated including these parts. Finally, the highly variable nature of the production process 10 requires that the schedule be confirmed either manually or by a real time part status monitor. In the present instance, the schedule is confirmed in step 35 by the system operator 31.

Figures 3, 7:
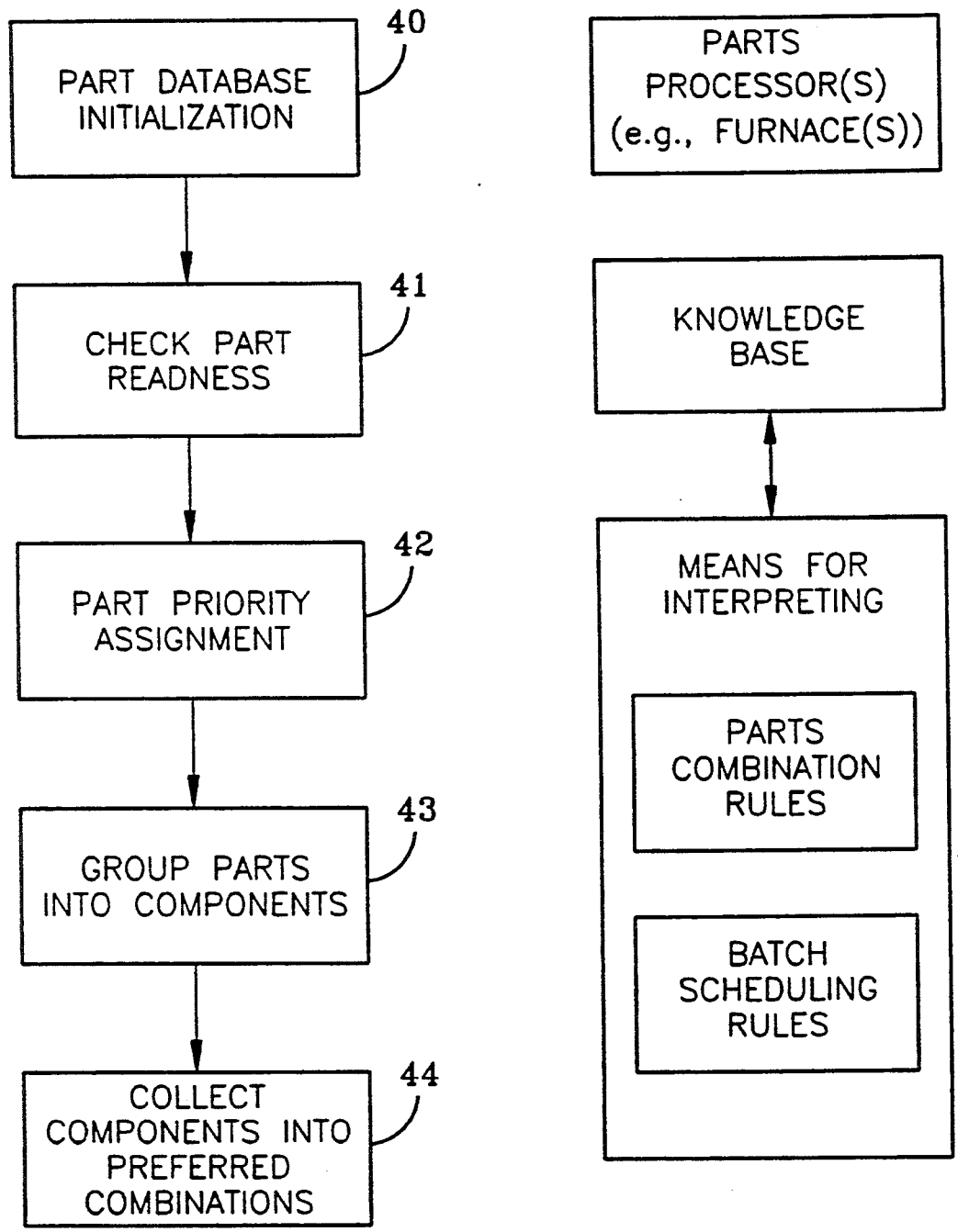
FIG. 3 is a flow chart showing the grouping of parts to be scheduled for manufacturing into components and the collection of components into preferred combinations.
FIG. 7 is a block diagram of an exemplary overall expert system according to the concept of the present invention.

FIG. 3 depicts in more detail the step 33 in which parts are grouped into components and the components are collected into preferred combinations. In step 40 the part database is initialized. Initialization involves: loading the parts data file, initialization file and any file created by prior scheduling; and checking the accuracy of and completing part data in the part data file. The initialization file includes parameters describing allowed categories, components and preferred combinations, preferred combination ranks, times required to sandblast parts in each category, glassing coat sequences, glassing coats and their corresponding firing temperatures, and firing tools available for each category.

Once the part database is initialized, the readiness of each part for its next firing is found in step 41 by the comparison of the current time with the next "ready time" associated in the database field for each part 12. A database field for each part is then assigned an appropriate attribute such as "Y" to indicate part 12 readiness or "N" to indicate not ready.

Next, each part 12 is assigned a priority in step 42 to indicate the urgency with which firing of its next coat is required. Priority rating is determined by the need to meet the delivery deadlines and avoid part oxidation after sandblasting and the first two ground coats. The rules for priority assignment for the first three coats are based on preselected maximum allowable times between sandblasting and the first ground coat, the first ground coat and the second ground coat, and the second ground coat and the first cover coat. For example, one such rule may take the following form:

IF: The next coat for this part is the first ground coat,
AND: This is the first day after sandblasting,
AND: The next day is fully available,
THEN: Assign priority 2,
ELSE: Assign priority 1 (the highest priority).

Rules also check the shutdown schedule to determine which days are fully available for firing since it is critical that the first three coats are completed within specified time limits.

After the part has undergone the first three coats, priority may be assigned based upon the time between the promised and approximate delivery dates (i.e., the approximate date part 12 is delivered to FPA 24). The difference between the promised and approximate delivery dates is computed for each part. The approximate delivery date may be obtained assuming a fixed amount of time for firing of each coat. Of course, it will be recognized that priority assignment may be readily varied as desired to a point where the permissible time between sandblasting and each coat and the time required for firing each coat is individually set. Additionally, the number of priority levels may be varied to suit the application.

Once readiness of each part 12 has been checked and priority assigned, ready parts 12 are grouped in step 43 into components in accordance with the rules embodying the above explained considerations. As ready parts 12 are grouped into components, parts with the highest priority are selected first from all eligible candidates, and parts with lower priority are selected next until all ready parts 12 have been assigned. The maximum and minimum part 12 thickness is determined for each component and retained for use in collecting preferred combinations.

Preferred combinations of components maximizing furnace utilization are set forth above in Table 2 together with their rank. Table 2 indicates that greater furnace utilization occurs when two category B components are fired together than when one category B component is fired, and so on. During component collection, rules insure that only components having compatible firing cycles, firing temperatures, and thickness ranges are collected, and components are combined in order of descending priority. The rank for each preferred combination is retained for use in scheduling.

Once all possible preferred combinations have been found, scheduling of the preferred combinations for firing takes place in step 34. In fact, scheduling is done in two parts, selectable by operator 31: long-term and short-term.

Long-term scheduling is used to generate weekly, biweekly, or monthly schedules to enable operator 31 to plan equipment utilization, to understand possible delivery dates, and to schedule future shut downs at the most appropriate times. Long-term scheduling also generates a sandblasting schedule based on the demand from the furnacing operation. In this way, the sandblasting 15 operation is driven by the furnacing 23 operation, and therefore all parts 12 after sandblasting 15 will have a greater likelihood of going through the furnacing 23 operation before oxidation occurs. However, since long-term scheduling cannot account for future new part orders and future disturbances such as parts 12 that must be reworked, it cannot optimally be used to schedule daily furnacing 23 operation.

Short-term scheduling, on the other hand, accounts for all new parts as they become ready for manufacture and disturbances as they arise to generate heuristically the best daily operating schedule. In this way, the furnacing 23 operation accommodates all parts 12 ready for firing (including sandblasted parts 12) in a timely fashion to avoid oxidation. Short-term scheduling also allows the operator 31 to confirm each batch previously scheduled and update any discrepancy that may have occurred, depicted in FIG. 2 as step 35.

In operation, it is desirable to perform long-term scheduling at least once every two weeks to generate the schedule for the sandblasting 15 operation and to perform short-term scheduling at least daily to generate the optimal furnacing 23 schedule. The period of time over which a single short-term schedule extends may be called the "time horizon".

Although long-term and short-term scheduling are performed separately, both scheduling operations are fully cognizant of the results of the other because both utilize and update part status and other information from the single part database.

Short-term scheduling (i.e., the determination of the order in which available preferred combinations should be scheduled) is heuristically found from four factors, listed in order of decreasing importance: priority rating; preferred combination rank; preferred firing-cycle sequence; and firing tool usage.

Priority rating, the predominant factor in determining firing schedule, has been previously discussed. When determining the next preferred combination to schedule, no combination with lower priority rating will be scheduled until all combinations with higher priority rating have already been scheduled.

The next most significant factor in determining firing scheduling is preferred combination rank, also previously discussed. When determining the next preferred combination to schedule, the combination with the highest rank is selected.

Certain firing-cycle sequences are preferred because they minimize the time and energy spent in modifying furnace temperature. These firing-cycle sequences are: normal-fire followed by normal-fire; normal-fire followed by mini-cycle; slow-heat-slow-cool followed by slow-heat-slow-cool; and minicycle followed by slow-heat-slow-cool.

Further time and energy savings may be had by recognizing that firing tools for parts 12 in categories A, B and C need to be preheated for 20 to 30 minutes. However, these firing tools, when going through mini-cycle or slow-heat-slow-cool cycle, can be used for consecutive firings without preheating. Therefore, where possible, firing tools for these categories should be used in consecutive firings.

Figure 4:
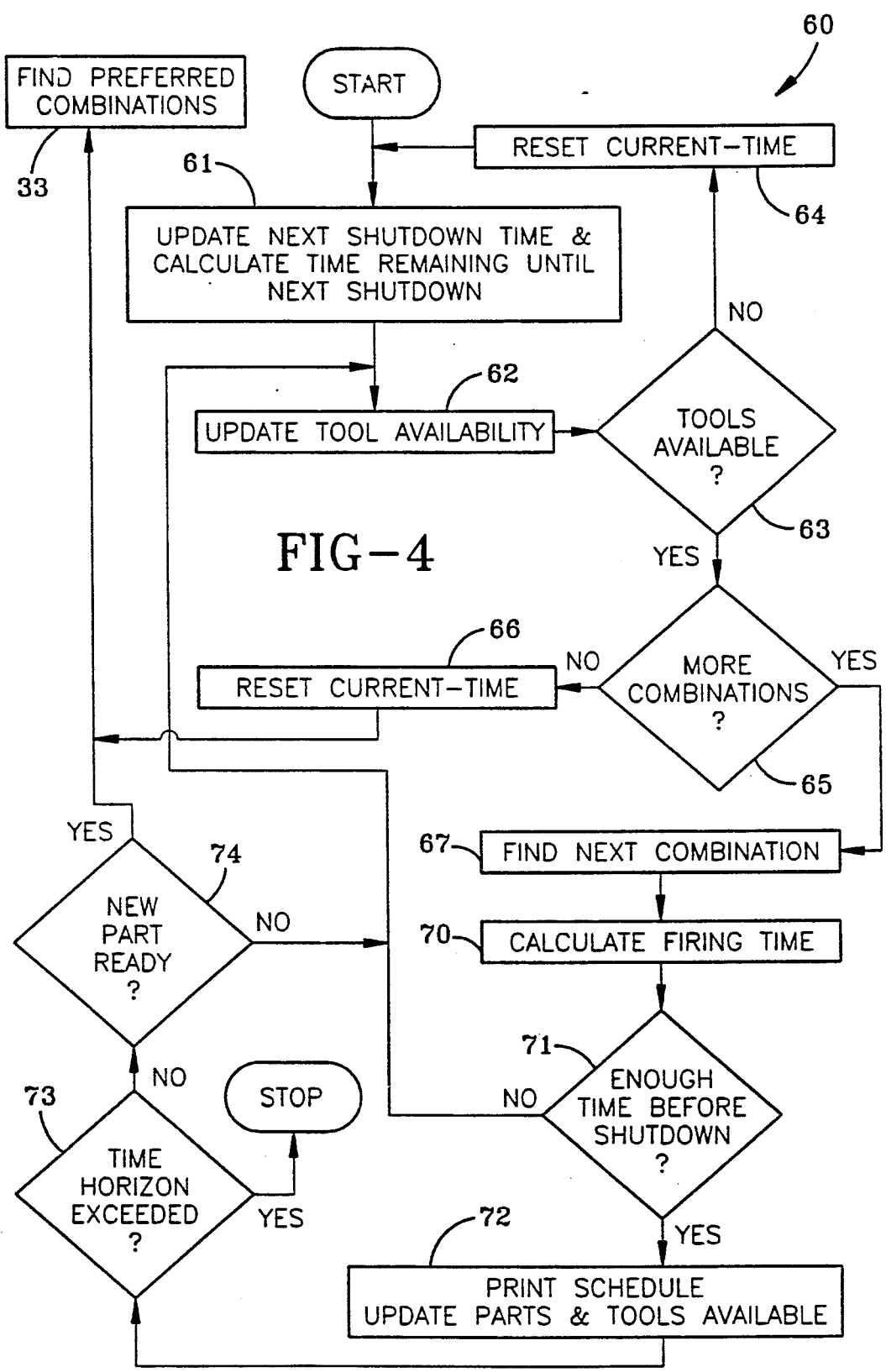
FIG. 4 is a flow chart showing the short-term scheduling of preferred combinations for firing in a single furnace.

FIG. 4 depicts in more detail the short-term scheduling portion of step 34 shown in FIG. 2, generally identified by the numeral 60. Short-term scheduling begins in step 61 by updating the next shutdown time and calculating the time remaining until the following shutdown time. Next, it is determined in steps 62, 63 and 64 which combinations have firing tools available and in steps 65 and 66, if there are any more combinations to schedule. On the basis of the short-term scheduling strategy described above, a combination is chosen for firing in step 67. The following is an example of the rules for short-term scheduling:

IF: There is an available combination X with priority rating PR and combination ranking CR,
AND: Firing tool for X is available,
AND: There is no available combination with priority rating higher than PR,
AND: There is no available combination with priority rating PR and combination ranking higher than CR,
THEN: Schedule combination X as the next batch.

After selecting the batch to be scheduled, the firing time, which depends on temperature, thickness of the parts and the total weight of the combinations to be fired (including tool weight), is then calculated in step 70. Pre-heating and handling times are also recognized. Next, in step 71 a check is made whether there is enough time to schedule the batch before shut down. If there is enough time, the scheduled batch is saved and tool availability status is updated in step 72, otherwise the present batch is not saved and scheduling of the remaining batches is continued.

After a batch is saved, a check is made in step 73 to see if the time horizon has been exceeded. If the time horizon has been exceeded, scheduling stops. If not, in step 74 a check is made to see if there exist parts 12 which have not been grouped into combinations because they were not ready for next firing, and have become ready during the scheduling process. If such parts 12 exist, all the parts are again grouped and collected in step 33 to ensure the best possible furnace utilization. Otherwise scheduling of the remaining batches is again continued.

Long-term scheduling minimizes the possibility that unneeded parts will be sandblasted resulting in either disruption of the normal operation of the furnacing 23 process or oxidation of the part. This is done by scheduling sandblasting 15 operation only when required either by the furnacing 23 operation or the need to meet delivery dates. This is necessary because there are tight time constraints imposed on the sandblasting 15 and firing 23 of the first three glassing coats in order to avoid part oxidation.

Figure 5:
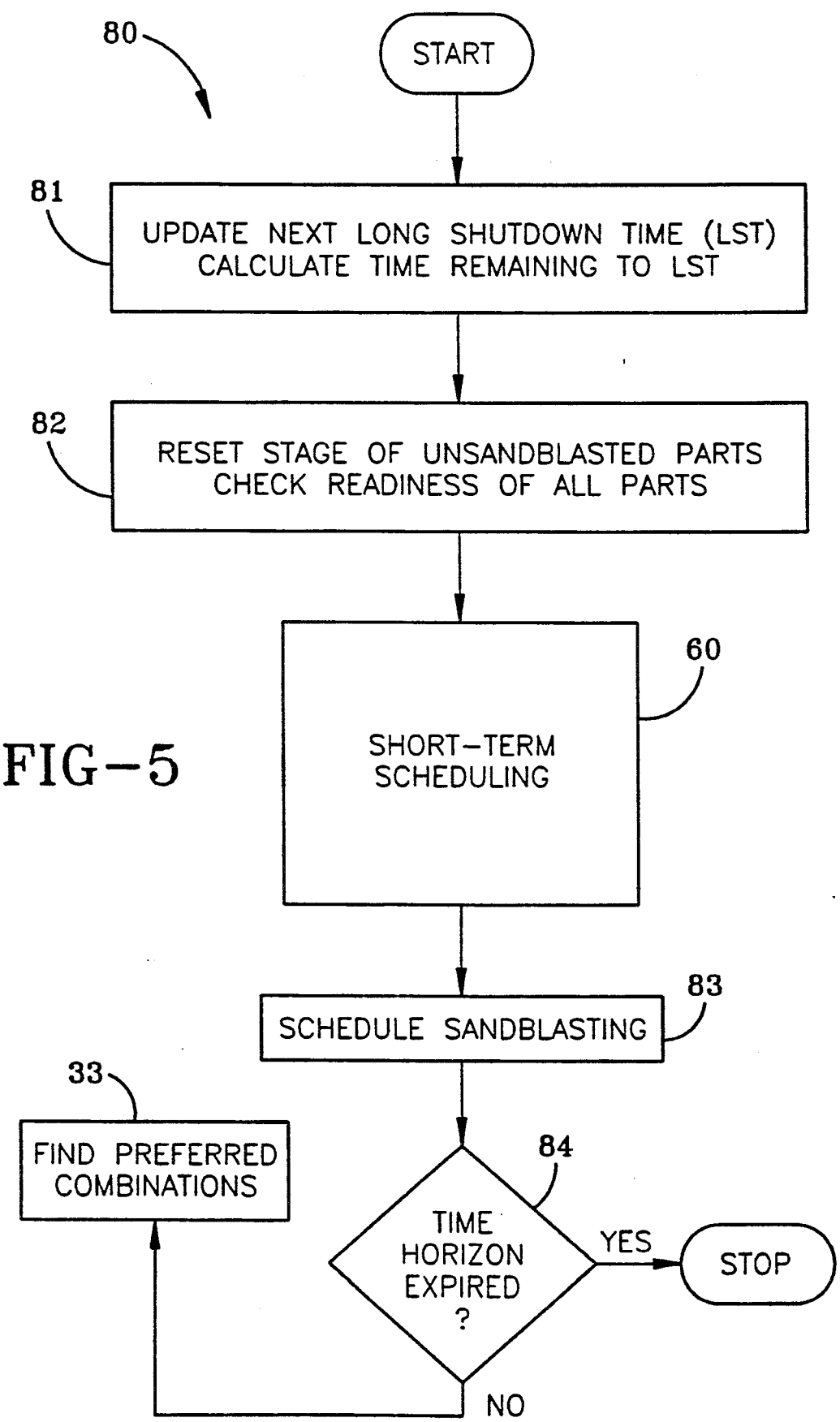
FIG. 5 is a flow chart showing the long-term scheduling of preferred combinations for firing in a single furnace and sandblasting of parts.

FIG. 5 depicts in more detail the long-term scheduling portion of step 34 shown in FIG. 2, generally identified by the numeral 80. Since long shut down periods (3 days or longer) usually will extend beyond the permissible tight time constraints, they are taken into account when generating the sandblasting schedule. Therefore, long-term scheduling begins in step 81 by updating the next long shutdown time and calculating the time remaining until that time. In step 82 a determination is made whether a part is ready for first ground coat by using the following heuristic rule:

IF: Part X has not been sandblasted,
AND: (Current scheduling time−actual time) is greater than the time required to sandblast part X,
AND: There is enough time after sandblasting to handle the first three coats before next long shut down time,
THEN: Set part X to be ready for first ground coat at current scheduling time.

Once sandblasting is scheduled, the time horizon is checked in step 84 and, if not expired, all the parts are again grouped and collected in step 33.

After this readiness check, the furnacing schedule is generated the same way as in the short-term scheduling 60. Each batch is scheduled based on delivery dates, furnace utilization, energy savings, and time savings. After each batch is selected for firing, however, the following rule is used in step 83 to determine whether sandblasting needs to be scheduled for any part in the batch:

IF: Part X has been scheduled for firing first ground coat at time Y,
AND: Part X has not been sandblasted,
AND: Sandblasting for part X takes time Z,
THEN: Schedule part X for sandblasting at time T=Y−Z.

Once sandblasting is scheduled, the time horizon is checked in step 84 and, if not expired, all the parts 12 are again grouped and collected in step 33.

In addition to scheduling sandblasting operation, the long-term scheduling may also provide other useful information such as future work load and possible delivery date of a specific order. This would allow anticipation of equipment utilization and scheduling of future long-term shutdowns at the most convenient times.

Table 3 shows an example of a batch scheduled for firing. The temperature and thickness of the batch and the total weight, which includes weight of the firing tools, may be used to determine the firing time. The completion time of the firing and the time when the parts in the batch will be ready for next firing (usually 36 hours after completion) are also calculated. The reason for scheduling the batch at this time is given. Not only is there no combination with priority higher than 1 and combination ranking higher than 4, but the energy utilization is also minimized because a normal cycle (N) firing sequence follows a normal cycle firing sequence in the previous batch and no large change in furnace temperature is required. This batch contains a D combination which includes three vessels of category D.

TABLE 3

EXAMPLE OF A SCHEDULED BATCH

| Batch Number: | 2 |
| Comb. Component(s): | D |
| Firing Code: | N following N |
| Firing Temp.: | 900 |
| Priority: | 1 |
| Combination Ranking: | 4 |
| Thickness (mm): | 30 |
| Total Weight (Kg): | 1100 |
| Starting Time: | 1987/4/1 2:38 |

TABLE 3-continued

| Preheating Time: | 0 minutes |
| Firing Time: | 1 hour 45 minutes |
| Handling Time: | 20 minutes |
| Completion Time: | 1987/4/1 4:43 |
| Next Ready Time: | 1987/4/1 16:43 |

Explanation:

There is no combination with higher priority or higher combination ranking. Also, this firing sequence has better energy utilization by minimizing the heat-up and cooling-down of the furnace.

| Object ID | Object Type | Coat Type | Category |
|---|---|---|---|
| AA001 | VESSEL | G1 | D |
| AA002 | VESSEL | G1 | D |
| AA003 | VESSEL | G1 | D |

More than one furnace 22 may be simultaneously utilized to fire parts 12. Each furnace 22 may have different operating characteristics and will likely have its own maintenance schedule. The expert system may employ additional rules to heuristically optimally schedule parts production where a plurality of furnaces 22 are available. In this instance scheduling and planning are performed on both a short-term and long-term basis for the same reasons such scheduling and planning are utilized for a single furnace.

Figure 6:
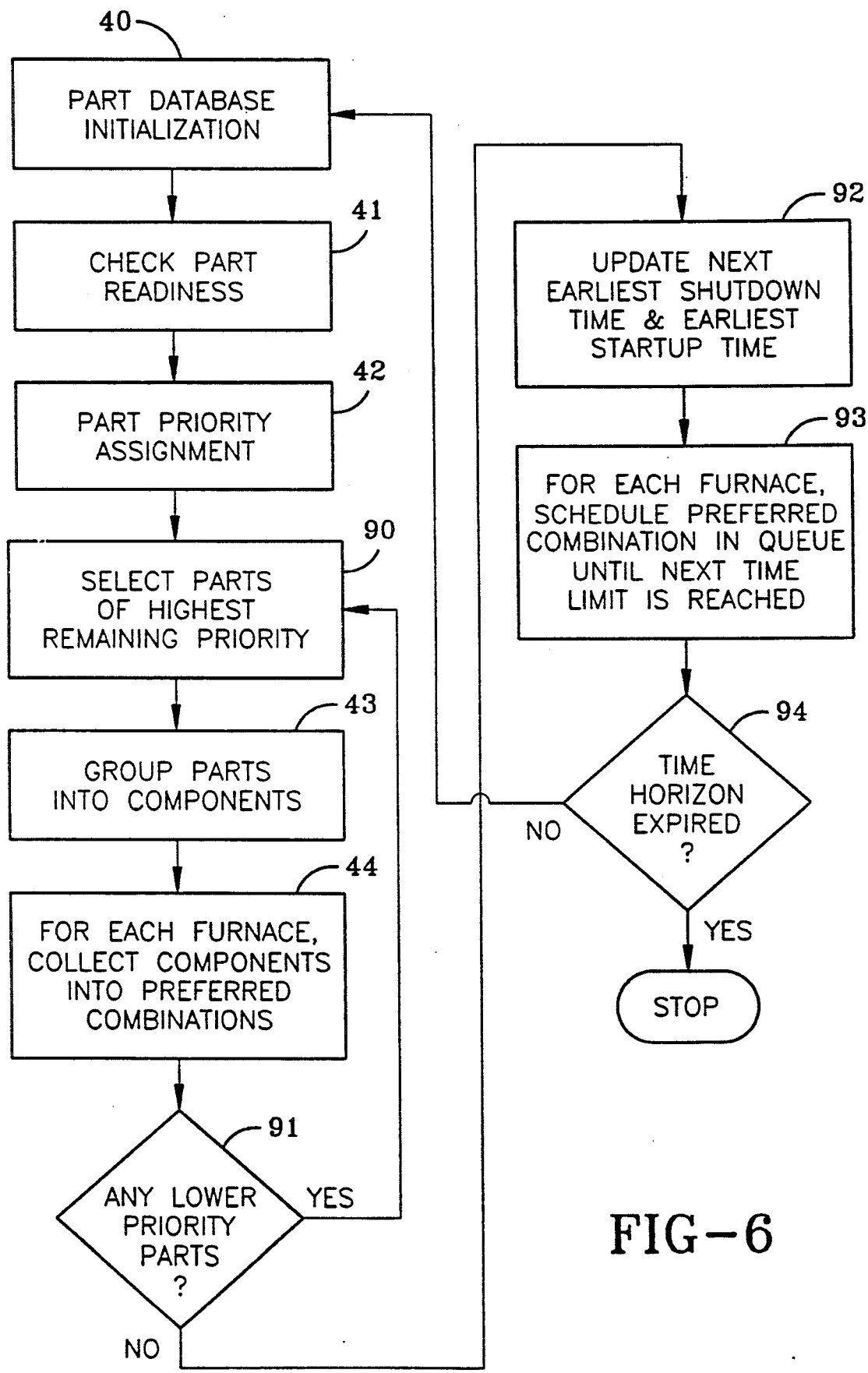
FIG. 6 is a flow chart showing the short-term scheduling of preferred combinations for firing in a plurality of furnaces.

FIG. 6 illustrates step 33 and the short-term scheduling portion of step 34 shown in FIG. 2 where a plurality of furnaces 22 are utilized to fire parts 12. In this implementation the part database initialization of step 40 includes establishing a queue for each furnace 22 to track preferred combinations to be fired in its respective furnace, and determining all permissible furnaces in which each part may be fired based upon part category and coating type. Of course, the permissible furnaces (or, more generally, select part processors) for a given part may include all the furnaces (part processors).

In the same manner that preferred combinations of components are ranked to indicate maximum furnace utilization in a single furnace, so too are all preferred combinations ranked for each furnace in which they may be fired, and this information stored in the part database. Preferred combinations that may be fired in more than one furnace are preferably assigned a different rank for each permissible furnace to facilitate scheduling determinations. Table 4 presents exemplary rankings for 3 furnaces for the group preferred combinations listed in Table 2.

TABLE 4

GROUP PREFERRED COMBINATIONS FOR MULTIPLE FURNACES

| Group # | Furnace & Rank | | | Component Content |
|---|---|---|---|---|
| | #1 | #2 | #3 | |
| 1 | 1 | | | A |
| 2 | 3 | | | B & B |
| 3 | 1 | | | B |
| 4 | 1 | | | B & C |
| 5 | 1 | | | B & D |
| 6 | 2 | | | C & C & C |
| 7 | 4 | | | C & C |
| 8 | 3 | | | C |
| 9 | 2 | | | C & D |
| 10 | 5 | | | D & D |
| 11 | 2 | 1 | | D |
| 12 | 3 | | 2 | D & E |
| 13 | 4 | | | D & F |
| 14 | 2 | | | D & G |
| 15 | 1 | | | D & H |
| 16 | 5 | | | E & E |
| 17 | 3 | | | E |

TABLE 4-continued

GROUP PREFERRED COMBINATIONS FOR MULTIPLE FURNACES

| Group # | Furnace & Rank #1 | #2 | #3 | Component Content |
|---|---|---|---|---|
| 18 | 4 | | | E & F |
| 19 | 4 | | | E & G |
| 20 | 1 | | | E & H |
| 21 | 4 | | | F & F |
| 22 | 1 | | | F |
| 23 | 4 | | | F & G |
| 24 | 1 | | | F & H |
| 25 | 4 | 3 | | G & G |
| 26 | 4 | | | G |
| 27 | | 2 | | G & H |
| 28 | 5 | | | H & H |
| 29 | | | | H |

Returning to FIG. 6, subsequent to part database initialization part readiness is checked and part priority assigned as discussed hereinabove in connection with steps 41 and 42 shown in FIG. 3. Next, in step 90 all parts of the highest remaining priority (such as priority 1 in the present example) are selected, grouped into components as done in step 43, and individually for each furnace collected into preferred combinations as performed in step 44. Step 91 repeats steps 90, 43 and 44 until parts 12 of all priorities have been collected into preferred combinations.

Since certain furnaces may possess characteristics preferable for firing, it may be desirable to collect components into preferred combinations individually for each furnace in a prechosen order. For example, it may be found desirable to collect components for furnaces proceeding from the furnace having the largest capacity to the furnace having the smallest capacity. The skilled artisan will recognize that any preference may be employed in the order of furnaces (or more generally, parts processors) for which preferred combinations are formed.

In order to achieve maximum furnace utilization, short-term scheduling is preferably redone every time a furnace becomes unavailable (shutdown), a furnace becomes available (startup) or a preselected maximum time period elapses since the last start of production processing. In choosing the preselected maximum time period (such as 24 hours) a balance should be made between the time required for scheduling parts 12 and typical firing times. "Processing time limit" may be used to refer to the period of time remaining before the first to occur of the following events: a furnace shutdown, a furnace startup and the expiration of the maximum time period.

Referring again to FIG. 6, the next earliest shutdown time and next earliest startup time is updated in step 92, and for each furnace 22 the preferred combinations for that furnace 22 scheduled in queue until the processing time limit is reached. Thereafter, step 94 checks the time horizon and, if not expired, repeats steps 33 and 34.

Long-term scheduling for a plurality of furnaces 22 is very similar to long-term scheduling for a single furnace as shown in FIG. 5, with three significant differences. First, as was done for short-term multiple furnace scheduling, part database initialization includes determining all permissible furnaces in which each coat may be fired. Second, additional action is taken in step 82 where the next coat of unsandblasted parts is set and the readiness of all parts checked. In this instance, for each unsandblasted, part those permissible furnaces with insufficient time remaining to allow complete processing (i.e., both sandblasting and firing) of the part are temporarily eliminated from the permissible furnaces list. In this manner, those parts 12 cannot be presently scheduled for firing in the eliminated furnace(s). Finally, short-term scheduling proceeds as is depicted in FIG. 6.

The skilled artisan will appreciate that there exits a variety of well-known computer languages particularly designed and adapted for expert system programming, any of which would be suitable for implementation of the production process 10 described herein. One such language is DEC OPS5, commercially available from Digital Equipment corporation of Maynard, Mass. OPS5 is designed to operate on DEC computer systems such as a model VAX 785 and a model MicroVAX II having at least approximately 5 megabytes of available application memory. DEC's User's Guide and Reference Manual for OPS5 describes in detail how to write, compile, and execute OPS5 programs in forward-chaining rules of substantive form as illustratively set forth hereinabove. The ordinary skilled artisan is well versed in implementing expert system rules in languages such as OPS5.

The skilled artisan will also appreciate other specific aspects of the implementation of the present invention well within the established arts. The menu-driven interface 32 is one example. Although it has been found convenient to provide operator 31 with the self-explanatory main menu depicted below in Table 5, it should be evident that many variations in such an interface are possible and within the spirit of the present invention.

TABLE 5

FURNACE SCHEDULING ADVISORY SYSTEM MAIN MENU

| | |
|---|---|
| A | Add Part to Database |
| B | Delete Part from Database |
| C | Examine or Update Part Status |
| D | Shutdown Schedule Utilities |
| E | Confirm Schedule |
| F | Run Schedule |
| G | Display Schedule Summary |
| H | Display Schedule Explanation |
| I | List Parts |
| J | List Leftover Combinations |
| K | Create a File with Schedule Summary |
| L | Save Parts Data |
| M | Exit |

Enter desired selection:

It will further be understood by one of ordinary skill that numerous parameters utilized in the example set forth herein may vary widely depending upon the particular application and the expert(s) upon which the knowledge base and rules are based. Among other parameters, significant variations may occur in category contents, component contents, part grouping factors, ranking of preferred combinations, processing time intervals, and priority rating factors and their weights. The nature of the part processor characteristics for other applications may suggest appreciable alterations be made in pre-processing and post-processing time allowances.

The expert system illustrated herein is particularly adapted for the heuristically optimal scheduling and planning of glass-lined vessel manufacture. Other applications where multiple parts are manufactured simultaneously in multiple-pass batch operations and a large number of manufacturing constraints vary during such manufacture, include, but are not limited to, the machining of parts, multiple-color printing, mixing of foods and mixing of pharmaceuticals. For example, machining of parts may require repetitive or variable sequencing of milling, grinding and lathing operations, to name a few, while multiple-color printing may involve repeatedly handling documents to separately apply each color mask.

Inasmuch as the present invention is subject to variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of optimally scheduling production operations where multiple parts are manufactured simultaneously in multiple-pass batch operations and large number of manufacturing constraints vary during such manufacture.

We claim:

1. A method for batch scheduling and manufacturing of a plurality of parts by at least one parts processor, the parts having a plurality of delivery dates and the parts and parts processor having a plurality of production constraints variable during manufacture, comprising:
    creating a knowledge base of select characteristics of the parts processor and parameters of the parts;
    generating a plurality of rules expressing a scheduling and planning strategy that substantially satisfies parts delivery dates and meets the production constraints;
    preparing parts for manufacture by the parts processor;
    combining parts suitable for simultaneous processing by the parts processor into all possible preferred combinations by applying a first plurality of said rules to said knowledge base;
    scheduling said preferred combinations for manufacture in batches by applying a second plurality of said rules to said knowledge base;
    collecting a plurality of said prepared parts in a first batch and loading said first batch in the parts processor;
    operating said parts processor to at least partially manufacture said first batch and thereafter inspecting said first batch for acceptable manufacture; and,
    manufacturing the remaining said preferred combinations in said scheduled batches, including the steps of repeating said step of combining parts suitable for simultaneous processing and said step of scheduling said preferred combinations where said manufacture of parts is unacceptable.

2. A method for batch scheduling and manufacturing of a plurality of parts, as set forth in claim 1, wherein said step of generating a plurality of rules includes the step of generating a plurality of rules expressing a multiple-pass scheduling and planning strategy that additionally substantially maximizes use of the parts processor, substantially maximizes part throughput and substantially minimizes energy utilization of the parts processor.

3. A method for batch scheduling and manufacturing of a plurality of parts, as set forth in claim 2, wherein said step of combining parts includes the step of grouping the parts into components based upon said parameters preselected for identifying parts suitable for simultaneous manufacture by the parts processor.

4. A method for batch scheduling and manufacturing of a plurality of parts, as set forth in claim 3, wherein said step of combining parts further includes the step of collecting components into said preferred combinations based upon said parameters preselected for identifying components suitable for simultaneous manufacture by the parts processor and said characteristics preselected for maximizing utilization of the parts processor.

5. A method for batch scheduling and manufacturing of a plurality of parts, as set forth in claim 4, wherein said step of combining parts further includes the step of verifying said parameters in said knowledge base before said step of grouping the parts and said step of collecting components, said parameters including the readiness of each part for further processing.

6. A method for batch scheduling and manufacturing of a plurality of parts, as set forth in claim 5, wherein said step of combining parts further includes the step of assigning a priority to each part indicative of the urgency with which further processing of that part is required.

7. A method for batch scheduling and manufacturing of a plurality of parts, as set forth in claim 6, wherein parts are manufactured in at least one of a plurality of parts processors each having its own characteristics, and further including the step of selecting parts of the highest remaining priority prior to said step of grouping the parts and said step of collecting components.

8. A method for batch scheduling and manufacturing of a plurality of parts, as set forth in claim 7, wherein a first production constraint is that each parts processor is available at different and varying times, a second production constraint is that each part may be manufactured in only select part processors identified in said knowledge base, and said step of collecting components includes the step of collecting for one parts processor at a time, in a preselected order, components into said preferred combinations.

9. A method for batch scheduling and manufacturing of a plurality of parts, as set forth in claim 2, wherein said step of scheduling said preferred combinations for manufacture in batches includes the step of generating heuristically an optimal short-term schedule for the manufacture of parts.

10. A method for batch scheduling and manufacturing of a plurality of parts, as set forth in claim 9, wherein one of the production constraints is that the parts processor is available for manufacture only at certain varying times, and said step of generating heuristically an optimal short-term schedule includes the step of updating the time the parts processor is available for manufacture during the short-term.

11. A method for batch scheduling and manufacturing of a plurality of parts, as set forth in claim 10, wherein another of the production constraints is that at least one tool is required for manufacturing certain of the parts, and said step of generating heuristically an optimal short-term schedule further includes the step of updating the availability of all said tools.

12. A method for batch scheduling and manufacturing of a plurality of parts, as set forth in claim 11, wherein said step of generating heuristically an optimal short-term schedule further includes the step of selecting the next said preferred combination for which the required said tools are available.

13. A method for batch scheduling and manufacturing of a plurality of parts, as set forth in claim 12, wherein the step of generating heuristically an optimal short-term schedule further includes the steps of calculating the time required for manufacturing said selected preferred combination, and scheduling said selected preferred combination if the parts processor is available for sufficient time to manufacture said selected preferred combination.

14. A method for batch scheduling and manufacturing of a plurality of parts, as set forth in claim 13, wherein said step of generating heuristically an optimal short-term schedule further includes the step of repeating said step of combining parts if an additional part has been readied for manufacture during scheduling of said selected preferred combination.

15. A method for batch scheduling and manufacturing of a plurality of parts, as set forth in claim 14, wherein parts are manufactured in a plurality of parts processors each having its own characteristics, a first production constraint is that each parts processor is available at different and varying times, and said step of generating heuristically an optimal short-term schedule further includes the step of determining the next time the availability of any parts processor changes.

16. A method for batch scheduling and manufacturing of a plurality of parts, as set forth in claim 15, wherein a second production constraint is that each part may be manufactured in only select part processors identified in said knowledge base, and said step of generating heuristically an optimal short-term schedule further includes the step of selecting for one parts processor at a time the available preferred combinations until the availability of any parts processor changes or a preselected time limit is reached and the step of repeating said step of combining parts if preferred combinations remain unscheduled after the availability of any parts processor changes or said preselected time limit is reached.

17. A method for batch scheduling and manufacturing of a plurality of parts, as set forth in claim 2, wherein said step of scheduling said preferred combinations for manufacture in batches further includes the step of generating heuristically an optimal long-term schedule for the manufacture of parts.

18. A method for batch scheduling and manufacturing of a plurality of parts, as set forth in claim 17, wherein said step of generating heuristically an optimal long-term schedule further includes the step of updating the time the parts processor is available for manufacture during the long-term.

19. A method for batch scheduling and manufacturing of a plurality of parts, as set forth in claim 18, wherein the parts require partial manufacture other than by the parts processor with preselected time constraints, and said step of generating heuristically an optimal long-term schedule further includes the step of determining the readiness of each part requiring said partial manufacture.

20. A method for batch scheduling and manufacturing of a plurality of parts, as set forth in claim 19, wherein said step of generating heuristically an optimal long-term schedule further includes the step of generating heuristically an optimal short-term schedule for all ready parts, and the step of generating a schedule for said partial manufacture of all parts requiring said partial manufacture.

21. A method for batch scheduling and manufacturing of a plurality of parts, as set forth in claim 20, wherein parts are manufactured in a plurality of parts processors each having its own characteristics, a first production constraint is that each parts processor is available at different and varying times, a second production constraint is that each part may be manufactured in only select part processors identified in said knowledge base, and said step of generating heuristically an optimal long-term schedule further includes the step of inhibiting the scheduling of each part requiring said partial manufacture in all parts processors that do not have sufficient time remaining before they become unavailable to complete said partial processing and manufacture by that part processor.

22. A system for batch scheduling and manufacturing of a plurality of parts having a plurality of delivery dates and a plurality of production constraints variable during manufacture, comprising:

parts processor means for receiving and at least partially manufacturing the parts, said parts processor means having a plurality of production constraints variable during manufacture;

means for preparing the parts for manufacture;

knowledge base means for storing select characteristics of the parts processor and parameters of the parts;

means for interpreting said characteristics and said parameters and generating a multiple-pass schedule to manufacture the parts in batches that substantially satisfies parts delivery dates, substantially maximizes use of the parts processor, substantially maximizes part throughput, substantially minimizes energy utilization of the parts processor and meets the production constraints, said means for interpreting said characteristics and said parameters including a first plurality of rules for combining parts suitable for simultaneous processing by the parts processor into all possible preferred combinations and a second plurality of rules for scheduling said preferred combinations for manufacture in batches;

means for receiving said multiple-pass schedule and collecting a plurality of said prepared parts in a first batch, said parts processor means receiving and at least partially manufacturing said first batch; and, means for inspecting said manufactured first batch for acceptable manufacture;

said parts processor means receiving and at least partially manufacturing the remaining said preferred combinations in said scheduled batches, said means for interpreting generating a further multiple-pass schedule where said manufacture of parts is unacceptable.

23. A system for batch scheduling and manufacturing of a plurality of parts by at least one parts processor, as set forth in claim 22, wherein said means for interpreting said characteristics and said parameters and generating a schedule includes means for generating a multiple-pass schedule to manufacture parts in batches that additionally substantially maximizes use of the parts processor, substantially maximizes part throughput and substantially minimizes energy utilization of the parts processor.

24. A system for batch scheduling and manufacturing of a plurality of parts by at least one parts processor, as set forth in claim 23, wherein said first plurality of rules includes a plurality of rules for grouping the parts into components based upon said parameters preselected for identifying parts suitable for simultaneous manufacture by the parts processor.

25. A system for batch scheduling and manufacturing of a plurality of parts by at least one parts processor, as set forth in claim 24, wherein said first plurality of rules further includes a plurality of rules for collecting components into said preferred combinations based upon said parameters preselected for identifying components suitable for simultaneous manufacture by the parts processor and said characteristics preselected for maximizing utilization of the parts processor.

26. A system for batch scheduling and manufacturing of a plurality of parts by at least one parts processor, as set forth in claim 25, wherein said first plurality of rules further includes a plurality of rules for verifying said parameters in said knowledge base before grouping the parts and collecting components, said parameters including the readiness of each part for further processing.

27. A system for batch scheduling and manufacturing of a plurality of parts by at least one parts processor, as set forth in claim 26, wherein said first plurality of rules further includes a plurality of rules for assigning a priority to each part indicative of the urgency with which further processing of that part is required.

28. A system for batch scheduling and manufacturing of a plurality of parts by at least one parts processor, as set forth in claim 27, further including a plurality of parts processors for manufacturing parts, each said part processor having its own characteristics, and said first plurality of rules further includes a plurality of rules for selecting parts of the highest remaining priority prior to grouping the parts and collecting components.

29. A system for batch scheduling and manufacturing of a plurality of parts by at least one parts processor, as set forth in claim 28, wherein a first production constraint is that each said parts processor is available at different and varying times, a second production constraint is that each part may be manufactured in only select said part processors identified in said knowledge base, and said rules for collecting components includes a plurality of rules for collecting for one said parts processor at a time, in a preselected order, components into preferred combinations.

30. A system for batch scheduling and manufacturing of a plurality of parts by at least one parts processor, as set forth in claim 29, wherein each said parts processor is a furnace and said parts are fired in said furnaces.

31. A system for batch scheduling and manufacturing of a plurality of parts by at least one parts processor, as set forth in claim 23, wherein said second plurality of rules further includes a plurality of rules for generating heuristically an optimal shortterm schedule for the manufacture of parts.

32. A system for batch scheduling and manufacturing of a plurality of parts by at least one parts processor, as set forth in claim 31, wherein a first production constraint is that the parts processor is available for manufacture only at certain varying times, and said rules for generating heuristically an optimal short-term schedule further includes a plurality of rules for updating the time the parts processor is available for manufacture during the short-term.

33. A system for batch scheduling and manufacturing of a plurality of parts by at least one parts processor, as set forth in claim 32, wherein a second production constraint is that at least one tool is required for manufacturing certain of the parts, and said rules for generating heuristically an optimal short-term schedule further includes a plurality of rules for updating the availability of all said tools.

34. A system for batch scheduling and manufacturing of a plurality of parts by at least one parts processor, as set forth in claim 33, wherein said rules for generating heuristically an optimal short-term schedule further includes a plurality of rules for selecting the next said preferred combination for which the required said tools are available.

35. A system for batch scheduling and manufacturing of a plurality of parts by at least one parts processor, as set forth in claim 34, wherein said rules for generating heuristically an optimal short-term schedule further includes a plurality of rules for calculating the time required for manufacturing said selected preferred combination and scheduling said selected preferred combination if the parts processor is available for sufficient time to manufacture said selected preferred combination.

36. A system for batch scheduling and manufacturing of a plurality of parts by at least one parts processor, as set forth in claim 35, wherein said rules for generating heuristically an optimal short-term schedule further includes a plurality of rules for repeating said rules for combining parts if an additional part has been readied for manufacture during scheduling of said selected preferred combination.

37. A system for batch scheduling and manufacturing of a plurality of parts by at least one parts processor, as set forth in claim 36, further including a plurality of parts processors for manufacturing parts, each part processor having its own characteristics, a third production constraint is that each parts processor is available at different and varying times, and said rules for generating heuristically an optimal short-term schedule further includes a plurality of rules for determining the next time the availability of any parts processor changes.

38. A system for batch scheduling and manufacturing of a plurality of parts by at least one parts processor, as set forth in claim 37, wherein a forth production constraint is that each part may be manufactured in only select part processors identified in said knowledge base, and said rules for generating heuristically an optimal short-term schedule further includes a plurality of rules for selecting for one parts processor at a time the available preferred combinations until the availability of any parts processor changes or a preselected time limit is reached and a plurality of rules for repeating said rules for combining parts if preferred combinations remain unscheduled after the availability of any parts processor changes or said preselected time limit is reached.

39. A system for batch scheduling and manufacturing of a plurality of parts by at least one parts processor, as set forth in claim 38, wherein each said parts processor is a furnace and said parts are fired in said furnaces.

40. A system for batch scheduling and manufacturing of a plurality of parts by at least one parts processor, as set forth in claim 23, wherein said rules for scheduling said preferred combinations for manufacture in batches further includes a plurality of rules for generating heuristically an optimal long-term schedule for the manufacture of parts.

41. A system for batch scheduling and manufacturing of a plurality of parts by at least one parts processor, as set forth in claim 40, wherein said rules for generating heuristically an optimal long-term schedule further includes a plurality of rules for updating the time the parts processor is available for manufacture during the long-term.

42. A system for batch scheduling and manufacturing of a plurality of parts by at least one parts processor, as set forth in claim 41, wherein the parts require partial manufacture other than by the parts processor with preselected time constraints, and said rules for generating heuristically an optimal long-term schedule further includes a plurality of rules for determining the readiness of each part requiring said partial manufacture.

43. A system for batch scheduling and manufacturing of a plurality of parts by at least one parts processor, as set forth in claim 42, wherein said rules for generating heuristically an optimal long-term schedule further includes a plurality of rules for generating heuristically an optimal short-term schedule for all ready parts, and a plurality of rules for generating a schedule for said partial manufacture of all parts requiring said partial manufacture.

44. A system for batch scheduling and manufacturing of a plurality of parts by at least one parts processor, as set forth in claim 43, further including a plurality of parts processors, each said part processor having its own characteristics, a first production constraint is that each said parts processor is available at different and varying times; a second production constraint is that each part may be manufactured in only select said part processors identified in said knowledge base, and said rules for generating heuristically an optimal long-term schedule further includes a plurality of rules for inhibiting the scheduling of each part requiring said partial manufacture in all said parts processors that do not have sufficient time remaining before they become unavailable to complete said partial processing and manufacture by that said part processor.

45. A system for batch scheduling and manufacturing of a plurality of parts by at least one parts processor, as set forth in claim 44, wherein each said parts processor is a furnace and said parts are fired in said furnaces.

* * * * *